(12) United States Patent
Fukuda et al.

(10) Patent No.: US 8,046,512 B2
(45) Date of Patent: *Oct. 25, 2011

(54) COMMUNICATION SYSTEM WITH MASTER AND SLAVE EXCHANGING CONTROL DATA IN PREDETERMINED COMMUNICATION PERIOD

(75) Inventors: Mamoru Fukuda, Fukuoka (JP); Tatsuhiko Satou, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/829,384

(22) Filed: Jul. 1, 2010

(65) Prior Publication Data

US 2010/0268998 A1    Oct. 21, 2010

Related U.S. Application Data

(63) Continuation of application No. 12/474,028, filed on May 28, 2009, now Pat. No. 7,769,935, which is a continuation of application No. PCT/JP2007/074198, filed on Dec. 17, 2007.

(30) Foreign Application Priority Data

Dec. 27, 2006 (JP) ................................. 2006-352122

(51) Int. Cl.
*G06F 13/00* (2006.01)
(52) U.S. Cl. ............... 710/110; 714/17; 714/43; 714/56
(58) Field of Classification Search .................. 710/110; 714/17, 18, 43, 56
See application file for complete search history.

(56) References Cited

U.S. PATENT DOCUMENTS

| 7,769,935 B2 * | 8/2010 | Fukuda et al. ................. 710/110 |
| 2003/0169687 A1 | 9/2003 | Bardini et al. |
| 2006/0117226 A1 | 6/2006 | Hirano |
| 2007/0240019 A1 * | 10/2007 | Brady et al. .................... 714/43 |
| 2008/0192661 A1 | 8/2008 | Hamamoto et al. |

FOREIGN PATENT DOCUMENTS

| GB | 2312358 | 10/1997 |
| JP | 08-033070 | 2/1996 |
| JP | 2006-254290 | 9/2006 |
| WO | WO 2005/119969 | 12/2005 |

OTHER PUBLICATIONS

Japanese Office Action for corresponding JP Application No. 2008-551035, Nov. 4, 2010.
Machine-generated translation of JP08-033070A, publication date Feb. 2, 1996.
Machine-generated translation of 2006-254290A, publication date Sep. 21, 2006.

* cited by examiner

*Primary Examiner* — Glenna A Auve
(74) *Attorney, Agent, or Firm* — Dittavong Mori & Steiner, P.C.

(57) ABSTRACT

A master includes a unit configured to register, for each slave, an expected communication time needed to exchange control data; a unit configured to register a slave in which a communication error is detected during exchange of the control data in a communication period; and a unit configured to re-execute exchange of the control data with the registered slave in the same communication period as that in which the communication error is detected. The unit configured to re-execute exchange of control data calculates a remaining resending time that can be used to re-execute exchange of the control data and, when the remaining resending time is longer than the expected communication time of the registered slave, resends the control data.

20 Claims, 8 Drawing Sheets

COMMUNICATION SYSTEM WITH MASTER AND SLAVE EXCHANGING CONTROL DATA IN PREDETERMINED COMMUNICATION PERIOD

CROSS-REFERENCE TO RELATED APPLICATION

The present application is a continuation application of the U.S. patent application Ser. No. 12/474,028 filed May 28, 2009, which in turn is a continuation application of PCT Patent Application Serial Number PCT/JP2007/074198 titled "Master/Slave Communication System and Master/Slave Communication Method" filed Dec. 17, 2007, which claims priority to Japanese Patent Application Number 2006-352122 filed at Japan Patent Office on Dec. 27, 2006 titled "Master/Slave Communication System and Master/Slave Communication Method." The contents of these applications are incorporated herein by reference in their entirety.

BACKGROUND OF THE INVENTION

1. Field of the Invention

The present invention relates to a master/slave communication system in which one master is connected to multiple slaves through a serial transmission line, and control data is exchanged between the master and the slaves in a predetermined communication period.

2. Description of Related Art

Generally in a manufacturing apparatus, a control device such as a programmable logic controller (PLC) or a personal computer functions as a master, and multiple slave devices such as a sensor, a relay, and a motor periodically exchange control data with the master. At a manufacturing site, control data may often be damaged on the transmission line due to, for example, noise generated from a machine or a relay device. Therefore, re-execution of exchange of control data is needed as means for enhancing the transmission reliability. Exchange of control data is used to mean both sending of command data from the master to a slave and receiving of response data from the slave.

In a scheme where exchange of control data is re-executed individually for each slave (hereinafter simply stated as resending), if the number of slaves for which resending is to be performed increases, the communication period is exceeded, and the communication period fluctuates. Thus, a communication period with sufficient margin for allowing resending to be performed for all the slaves is set in advance.

For example, it is proposed in Japanese Unexamined Patent Application Publication No. 08-033070 for a master to have a resending counter for each slave and a resending total counter that counts the total number of times resending is performed. In this proposal, resending is performed when the count value of the resending counter is less than or equal to a limit value set in advance for each slave, and when the count value of the resending total counter is also less than or equal to a preset limit value.

SUMMARY OF THE INVENTION

According to an aspect of the present invention, there is provided a master/slave communication system including one master; and at least one slave connected to the master through a serial transmission line, control data being exchanged between the at least one slave and the master in a predetermined communication period. The master includes a unit configured to register, for each of the at least one slave, an expected communication time needed to exchange the control data; a unit configured to register a slave in which a communication error is detected during exchange of the control data in the communication period; and a unit configured to re-execute exchange of the control data with the registered slave in the same communication period as that in which the communication error is detected. The unit configured to re-execute exchange of the control data calculates a remaining resending time that can be used to re-execute exchange of the control data and, when the remaining resending time is longer than the expected communication time of the registered slave, resends the control data.

According to another aspect of the present invention, there is provided a master/slave communication method of connecting one master to one or multiple slaves through a serial transmission line and exchanging control data between the master and the slaves in a predetermined communication period. A process of the master, which is executed in the individual communication period, includes the steps of sending the control data to the slaves; receiving the control data from the slaves; repeating, for each of the slaves, the step of unconditionally registering, as a target to which resending is to be performed, a slave when a communication error is detected in the step of sending or the step of receiving; taking out the slave registered as the target to which resending is to be performed; comparing a remaining resending time that can be used to re-execute exchange of the control data with an expected communication time needed to exchange the control data of the slave; and re-executing exchange of the control data when the remaining resending time is longer than the expected communication time of the registered slave.

BRIEF DESCRIPTION OF THE DRAWINGS

Exemplary embodiments of the present invention will be described in detail based on the following figures, wherein.

DETAILED DESCRIPTION OF THE PREFERRED EMBODIMENTS

Embodiments of the present invention will now be described below with reference to the drawings.

Figure 1:
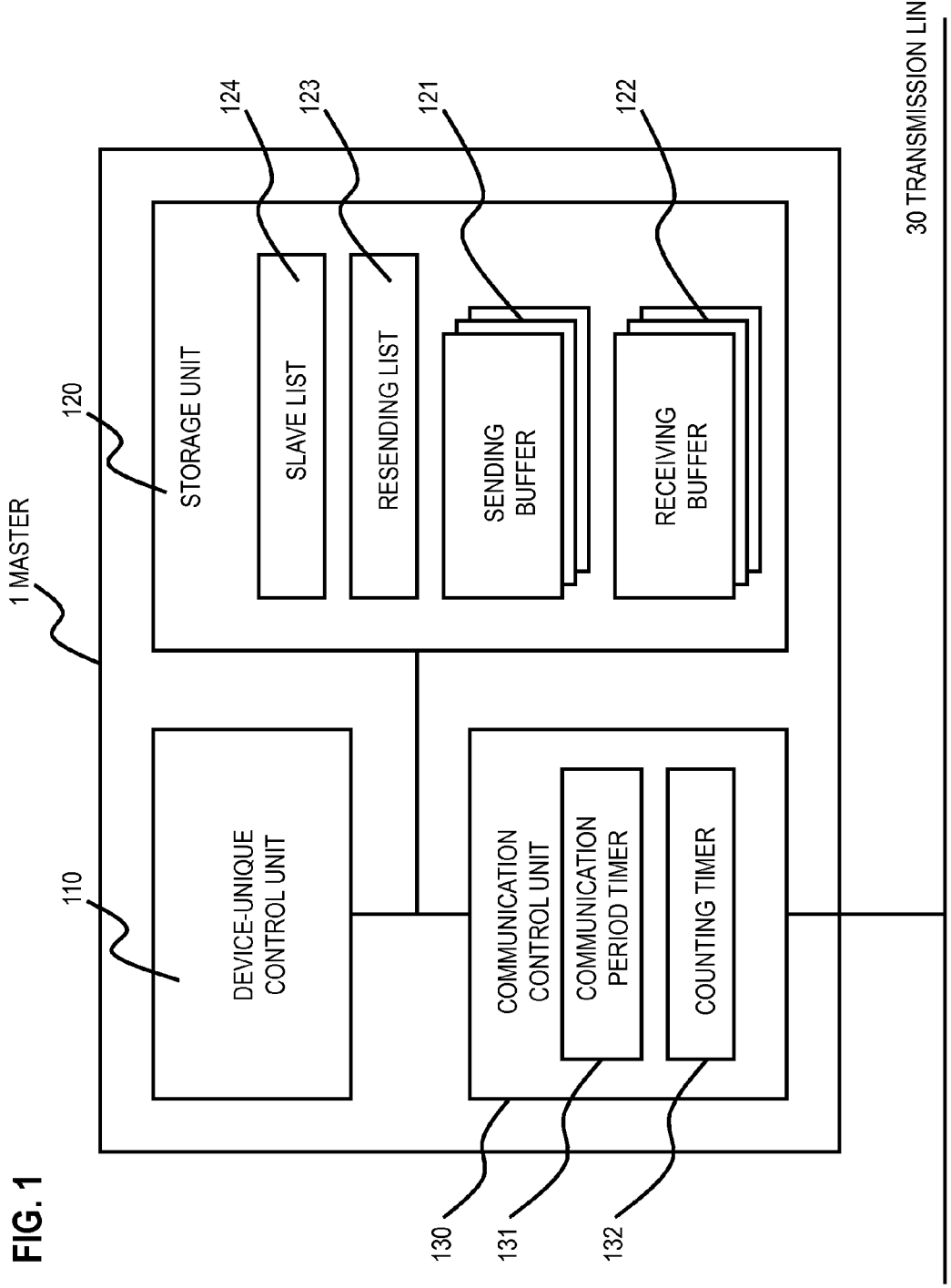
FIG. 1 is a block diagram of a master in a first embodiment of the present invention.
Figure 8:
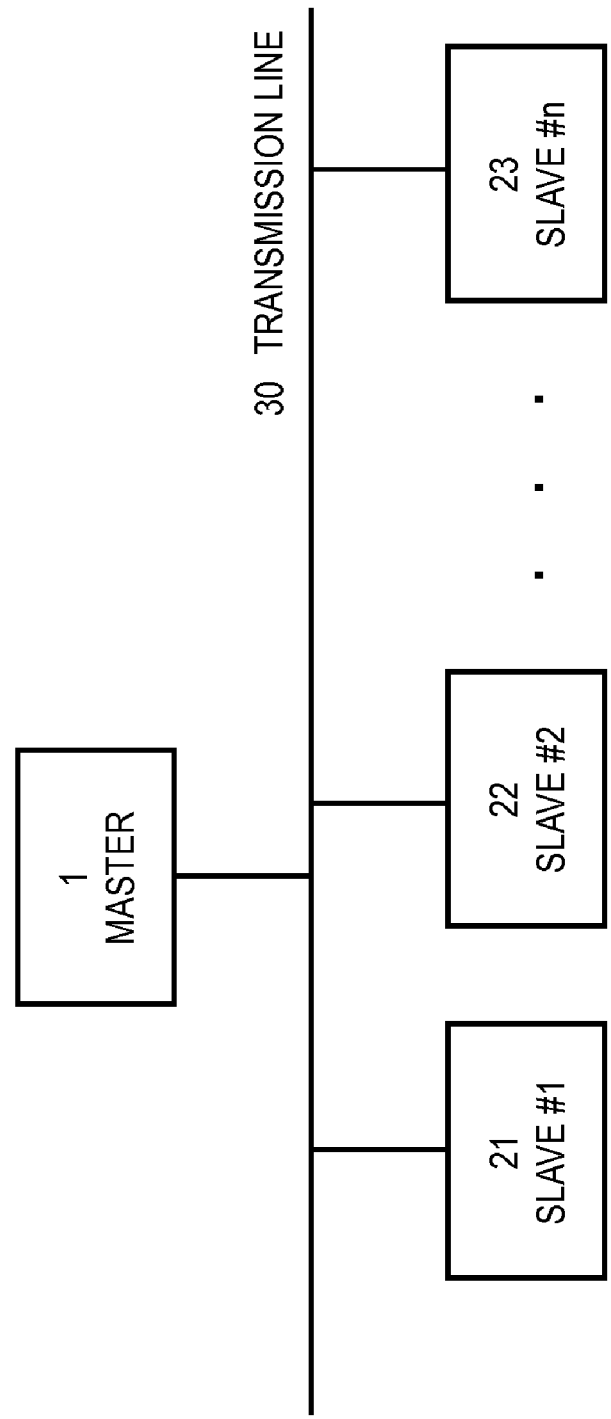
FIG. 8 is a system configuration diagram of a master/slave communication system to which the present invention is applied.

FIG. 8 illustrates a system configuration example of a master/slave communication system. One master device is connected to multiple slave devices via a transmission line 30. FIG. 1 is a block diagram of a master according to a first embodiment of the present invention. A master 1 includes a device-unique control unit 110, a storage unit 120, and a communication control unit 130. The master 1 is connected via the communication control unit 130 to a transmission line 30. The device-unique control unit 110 is a portion that analyzes response data received from a slave and generates next command data in accordance with predetermined control logic. The generated command data is stored in a sending buffer 121 in the storage unit 120, and the stored command data is sent to a slave using the communication control unit 130.

Also, the response data received from the slave is stored in a receiving buffer 122 in the storage unit 120 using the communication control unit 130, and the stored response data is read to the device-unique control unit 110. The master 1 further includes a resending list 123 in which a slave with which exchange of control data has failed is registered, and a slave list 124 that stores information regarding a slave connected to the transmission line 30. Here, exchange of control data is used to mean that the master 1 sends command data to a slave and the master 1 receives response data from the slave.

Figure 2:
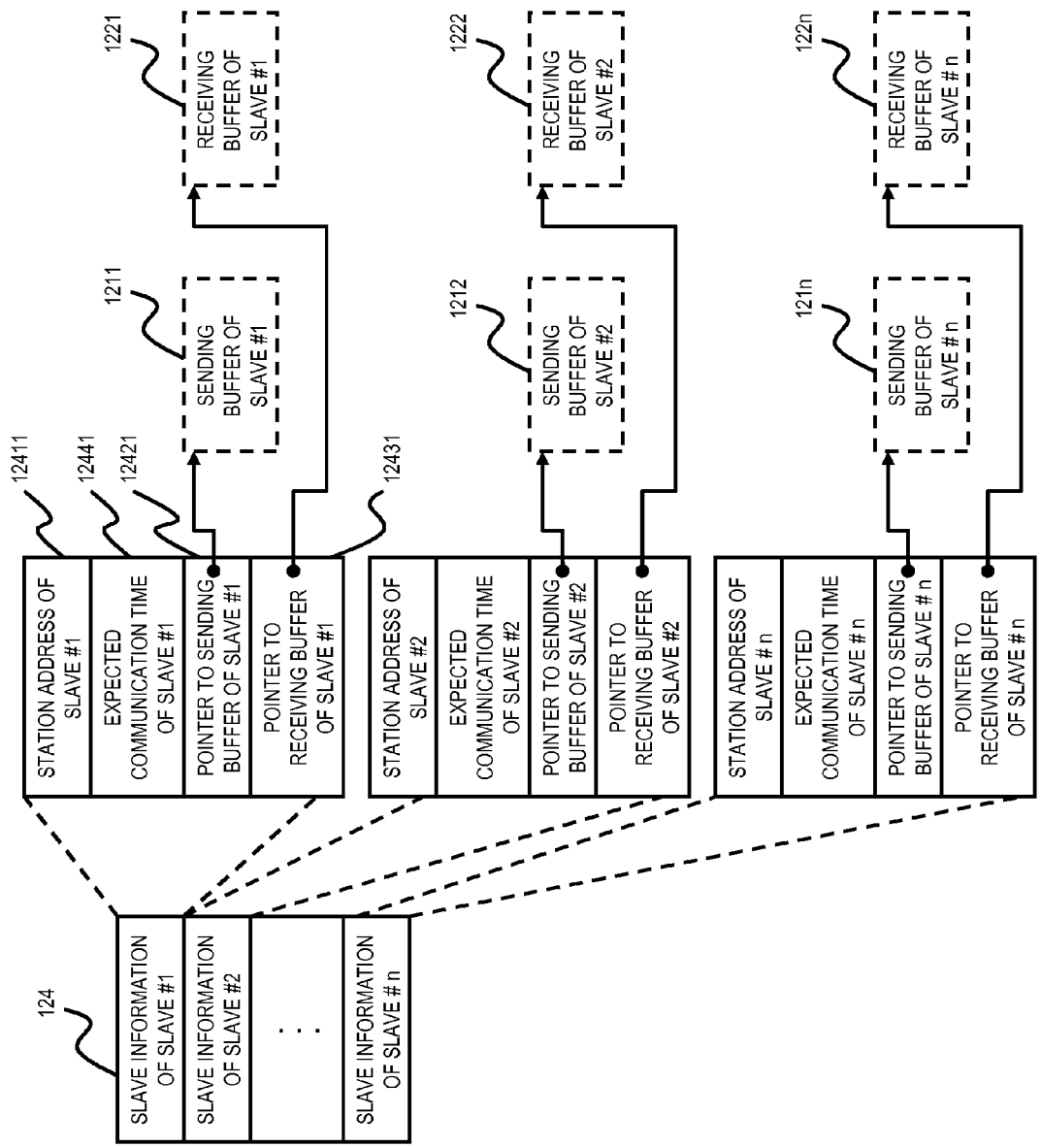
FIG. 2 is a diagram illustrating a list of slave information in the first embodiment of the present invention.

FIG. 2 is a diagram illustrating the structure of the slave list 124 in the first embodiment. The slave list 124 is configured by a sequence of slave information storing information regarding each slave. A sequence of slave information has a station address 12411 of each slave, a pointer 12421 to the sending buffer, and a pointer 12431 to the receiving buffer. Furthermore, as a feature of the present invention, a sequence of slave information includes an expected communication time 12441 that stores the time needed to exchange control data, which is counted from the start of sending of control data to a slave.

Figure 3:
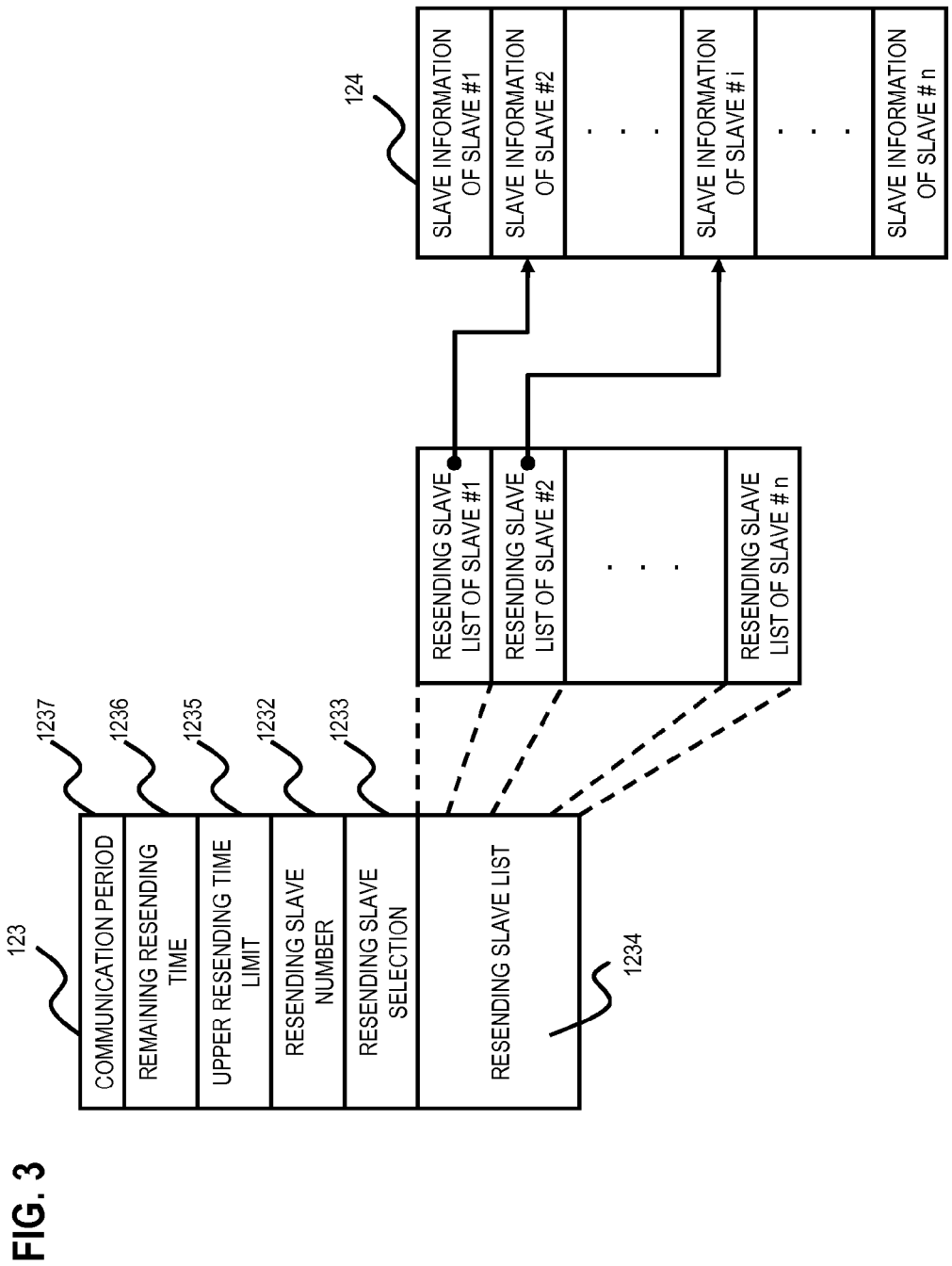
FIG. 3 is a diagram illustrating the structure of a resending list in the first embodiment of the present invention.

FIG. 3 is a diagram illustrating the structure of the resending list 123 in the first embodiment.

The resending list 123 includes a communication period 1237, an upper resending time limit 1235, a resending slave number 1232, a resending slave list 1234, a resending slave selection 1233, and a remaining resending time 1236. Here, the upper resending time limit 1235 stores the maximum value of time that can be used for resending in the communication period. The resending slave number 1232 stores the number of slaves to which resending is to be performed, in which errors are detected during exchange of control data. The resending slave list 1234 stores pointers to slave information of the slaves. The resending slave selection 1233 stores a value that indicates a slave, in the resending slave list 1234, to which resending is currently being performed. The remaining resending time 1236 stores time that can be used to perform resending in the communication period.

The communication period 1237 and the upper resending time limit 1235 are set by a user before the start of exchange of control data, and are not changed after the start of exchange of control data. The upper resending time limit 1235 may be set by the user, together with the communication period 1237. Alternatively, the upper resending time limit 1235 may be a time obtained by subtracting the total expected communication times 12441 of all slaves from the communication period 1237.

In every communication period, the resending slave number 1232 is initialized to zero using the communication control unit 130 in the master 1. Similarly, in every communication period, the remaining resending time 1236 is initialized to the upper resending time limit 1235 using the communication control unit 130. Using the communication control unit 130, the resending slave number 1232 is incremented by one when sending of command data or receiving of response data fails during exchange of control data and is decremented by one when exchange of control data is successfully completed by executing resending. Using the communication control unit 130, every time resending is executed, regardless of the resending result, the expected communication time 12441 of a slave to which resending is performed is subtracted from the remaining resending time 1236.

Now, a method of counting the expected communication time 12441 in the first embodiment will be described using FIG. 4. This flow is to be executed at an arbitrary timing before the master 1 starts exchanging control data. In the following description, a communication period timer 131 may be used as a timer stated as a counting timer 132.

At first, the master 1 generates command data for counting the expected communication time (S30001). The command data for counting, which is generated at this time, has the same data length as command data to be sent from the master 1 to a slave for which counting is performed at the time of exchanging control data. Similarly, each slave generates response data for counting (not illustrated in the drawings), which has the same data length as response data to be sent to the master 1 at the time of exchanging control data.

Next, the master 1 activates the counting timer 132 (S30002), sends the command data for counting (S30003), and receives from the slave the response data for counting (S30004). When the master 1 successfully receives from the slave the response data for counting, the master 1 stops the counting timer 132 (S30006), and calculates the expected communication time from the current time of the timer (S30007). Next, the master 1 registers the expected communication time in the expected communication time 12441 of the slave in the slave list 124 (S30008), and accumulates the calculated expected communication time (S30009).

The master 1 repeats the procedure from step S30001 to step S30009 for all the slaves registered in the slave list 124. Thereafter, the master 1 calculates, as the upper resending time limit, the difference between the accumulated value of the expected communication times calculated in step S30009 and the communication period 1237 in the resending list 123 (S30011). The master 1 stores the calculated upper resending time limit in the upper resending time limit 1235 in the resending list 123. In this example, the command data for counting and the command data for control data have the same data length, and the response data for counting and the response data for control data have the same data length. However, these items of data may not have the same data length, and transmission times may be corrected for differences in data length at the time of calculating the expected communication time.

As above, the method of counting the expected communication time in accordance with this procedure does not require complicated calculations even when a relay time and a response processing time are different in each device depending on the type of connected device. Also, the method of counting the expected communication time in accordance with this procedure does not require complicated calculations even when a signal propagation delay is different in each transmission line depending on the transmission line length.

Figure 5:
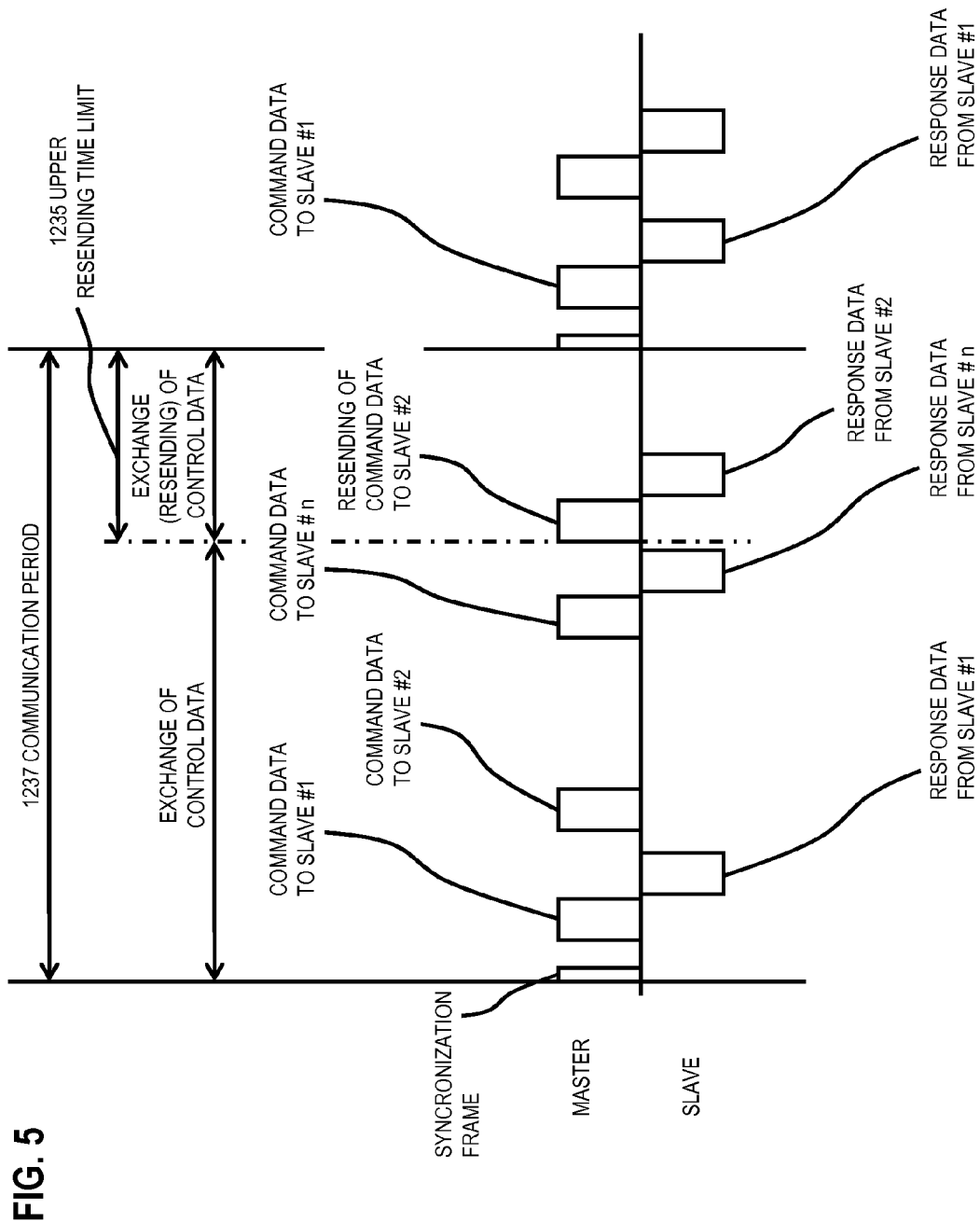
FIG. 5 is a communication timing chart in the first embodiment of the present invention.

FIG. 5 is a communication timing chart according to the first embodiment of the present invention. A communication period in this example includes a band for performing exchange of control data and a band for re-executing this. In the band for exchanging control data, the master 1 first broadcasts a synchronization frame indicating the start of a communication period, and then executes exchange of control data individually with each slave. Here, if there is a slave to which sending of command data fails or a slave from which receiving of response data fails, the master 1 registers the slave in the resending list 123. Next, the master 1 performs resending in accordance with the registration in the resending list 123. Here, when exchange of the entire control data is executed successfully, message communication may be executed using the band for performing resending. Also, when resending is to be performed, message communication may be executed within the range of time left before the end of the communication period (not illustrated in the drawings).

Figure 6:
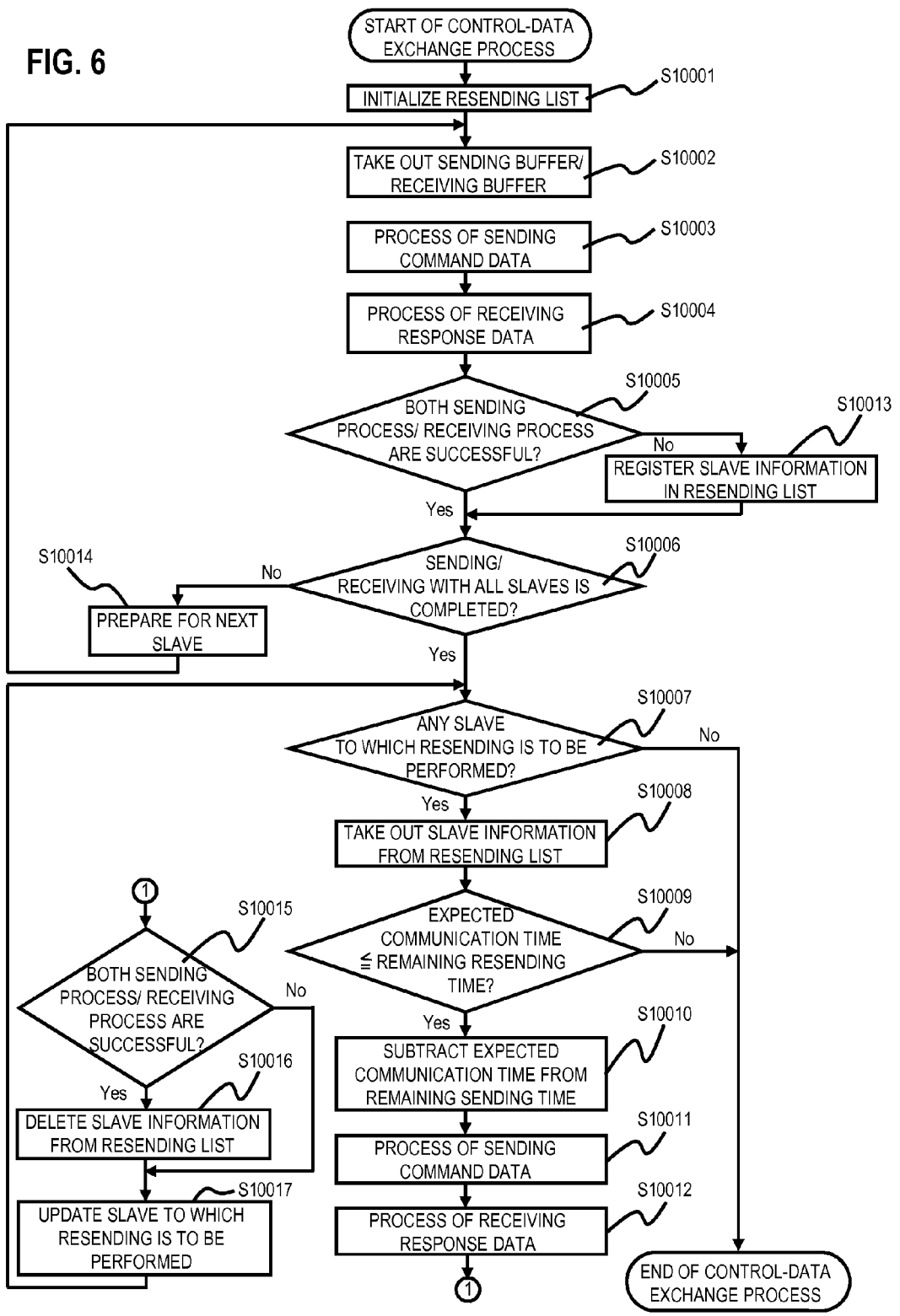
FIG. 6 is a flowchart illustrating an operation example of a control-data exchange process performed using a master in the first embodiment of the present invention.

FIG. 6 is a flowchart illustrating an operation example of a control-data exchange process performed in each communication period using the communication control unit 130 in the master 1. A process illustrated in this flowchart is activated every time at the timing of the start of a communication period. The communication control unit 130 initializes the resending list 123 at the timing of the start of a communication period (S10001). Specifically, the communication control unit 130 clears the resending slave number 1232 to zero and substitutes the upper resending time limit 1235 for the remaining resending time 1236. Next, the communication control unit 130 takes out the sending buffer and the receiving buffer of a slave from slave information registered at the beginning of the slave list 124 from the storage unit 120 (S10002) and sends command data to the slave (S10003). After sending, the communication control unit 130 receives response data from the slave (S10004).

When the communication control unit 130 fails sending the command data or fails receiving the response data in step S10005, the communication control unit 130 registers slave information of the slave in the resending list 123 (S10013). Specifically, registration of the slave information means that a pointer to the slave information is stored in a sequence element in the resending slave list 1234, which has the resending slave number 1232 as a sequence element number, and the resending slave number 1232 is incremented by one.

Also, when the value of the resending slave number 1232 prior to being incremented is zero, the communication control unit 130 stores the head pointer in the resending slave list 1234 in the resending slave selection 1233. When the communication control unit 130 successfully sends the command data and receives the response data in step S10005, no updating of the resending list 123 is performed. In order to perform the foregoing procedure for each of the slaves in the registered order in the slave list 124, the communication control unit 130 takes out slave information of the next slave from the slave list 124 (S10014), and repeats the procedure from step S10002.

When sending/receiving with all the slaves is completed, the communication control unit 130 refers to the resending slave number 1232 and determines whether a slave to which resending is to be performed is registered (S10007). When a target slave to which resending is to be performed is registered, that is, when the number of the resending slave number 1232 is one or more, the communication control unit 130 takes out the registered slave information in a sequential manner from the beginning of the resending slave list 1234. The communication control unit 130 compares the remaining resending time 1236 with the expected communication time 12441 of the slave (S10009), and, when the remaining resending time 1236 is longer than the expected communication time 12441, the communication control unit 130 subtracts the expected communication time 12441 from the remaining resending time 1236 (S10010), and performs resending (S10011 and S10012). When the remaining resending time 1236 is shorter than the communication time 12441, the communication control unit 130 terminates the control-data exchange process.

When resending is performed, the communication control unit 130 determines whether sending of command data and receiving of response data are successfully completed (S10015). When both are successful, the communication control unit 130 deletes the slave information of the slave from the resending list 123 (S10016). Deletion of the slave information means deletion of the pointer to the slave information, which is registered in the sequence element indicated by the resending slave selection 1233 in the resending slave list 1234, and decrementing of the resending slave number 1232 by one.

When resending is performed, regardless of the resending result, the communication control unit 130 updates the resending slave selection 1233 to the next slave in the resending slave list 1234 (S10017), and thereafter repeats the flow from step S10007. On this occasion, when the resending slave selection 1233 prior to being updated indicates the last registered slave in the resending slave list 1234, the communication control unit 130 updates the resending slave selection 1233 so as to indicate the first slave registered in the resending slave list 1234. Accordingly, slaves registered in the resending list 123 are equally given chances for resending. Furthermore, even when resending fails, resending can be repeatedly performed as long as there is a remaining resending time.

Now, a second embodiment of the present invention will be described. Here, since the block diagram of the master 1, the structure of the slave list 124, the structure of the resending list 123, the method of counting the expected communication time, and the communication timing chart in the second embodiment are the same as those in the first embodiment, descriptions thereof are omitted.

Figure 7:
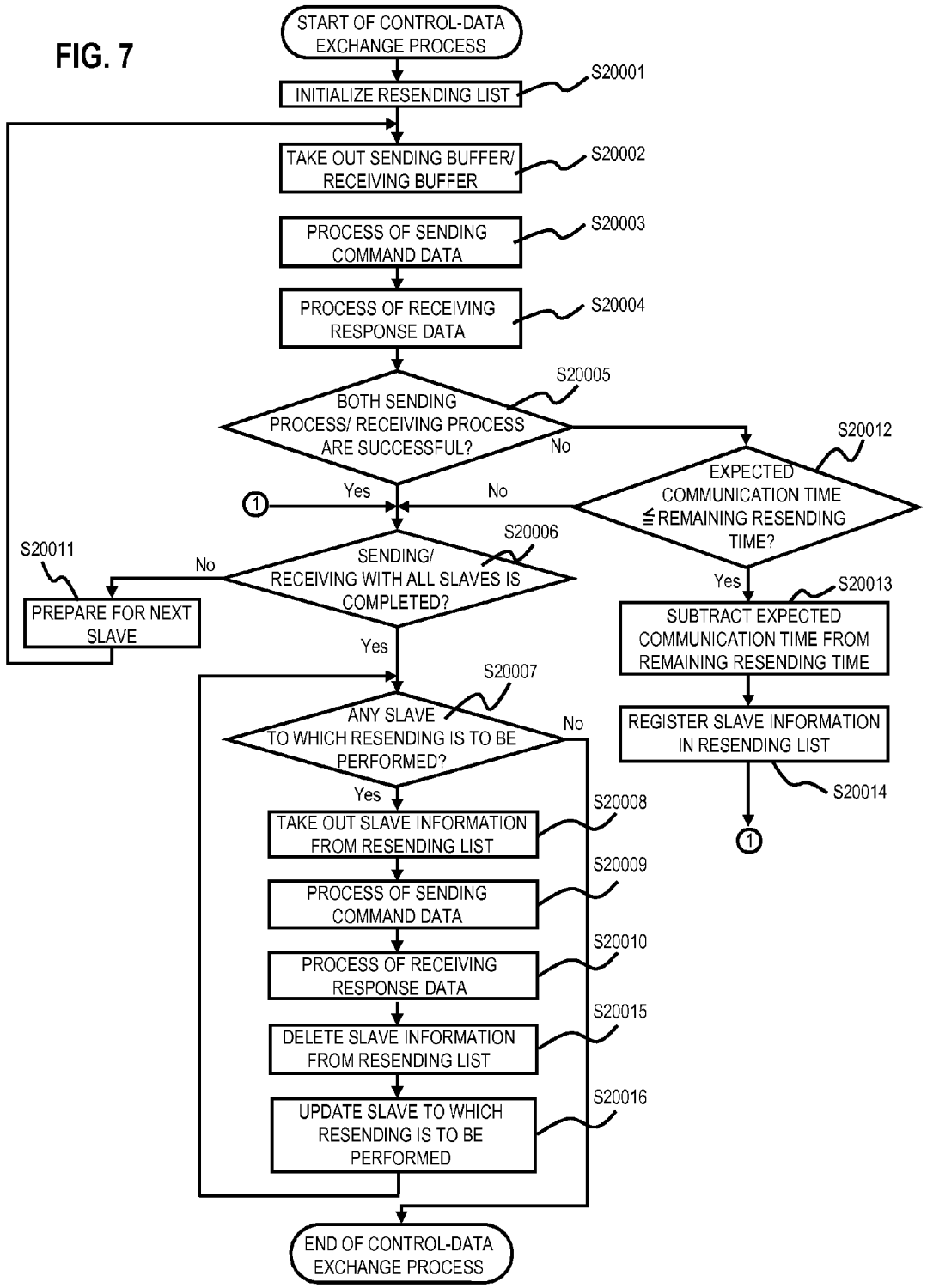
FIG. 7 is a flowchart illustrating an operation example of a control-data exchange process performed using the master in a second embodiment of the present invention.

FIG. 7 is a flowchart illustrating an operation example of a control-data exchange process performed in each communication period using the communication control unit 130 in the master 1 in the second embodiment. A process illustrated in this flowchart is activated every time at the timing of the start of a communication period, as in the first embodiment. Also in the second embodiment, the communication control unit 130 initializes the resending list 123 at the timing of the start of a communication period (S20001). Thereafter, the communication control unit 130 sequentially sends command data to slaves in the registered order in the slave list 124 (S20003), and receives response data from the slaves (S20004). This procedure is the same as that in the first embodiment.

However, in the second embodiment, a process performed using the communication control unit 130 in the case where sending of command data or receiving of response data fails is different from that in the first embodiment. When the communication control unit 130 fails sending command data to a slave or fails receiving response data from a slave, the communication control unit 130 compares the expected communication time 12441 of the slave with the remaining resending time 1236 (S20012). When the expected communication time 12441 is less than or equal to the remaining resending time 1236, the communication control unit 130 subtracts the expected communication time 12441 from the remaining resending time 1236 (S20013), and registers slave information of the slave in the resending list 123 (S20014). In contrast, when the expected communication time 12441 is greater than the remaining resending time 1236, the communication control unit 130 does not register the slave information in the resending list 123.

When sending/receiving with all the slaves is completed, the communication control unit 130 refers to the resending slave number 1232 and determines whether a slave to which resending is to be performed is registered (S20007). When a target slave to which resending is to be performed is registered, that is, when the number of the resending slave number 1232 is one or more, the communication control unit 130 executes resending. The resending procedure is the same as that in the first embodiment. In the second embodiment, unlike the first embodiment, resending is unconditionally executed once for all slaves registered in the resending list. Note that the communication control unit 130 may change the resending method in the second embodiment (S20007 in FIG. 7 and onward) to the resending method in the first embodiment (S10007 in FIG. 6 and onward), whereby the communication control unit 130 may become able to perform resending multiple times for the same slave as long as there is a remaining resending time.

Now, a third embodiment of the present invention will be described. Here, since the difference between the first and second embodiments and the third embodiment is only about counting of the expected communication time 12441, only this difference will be described below.

Figure 4:
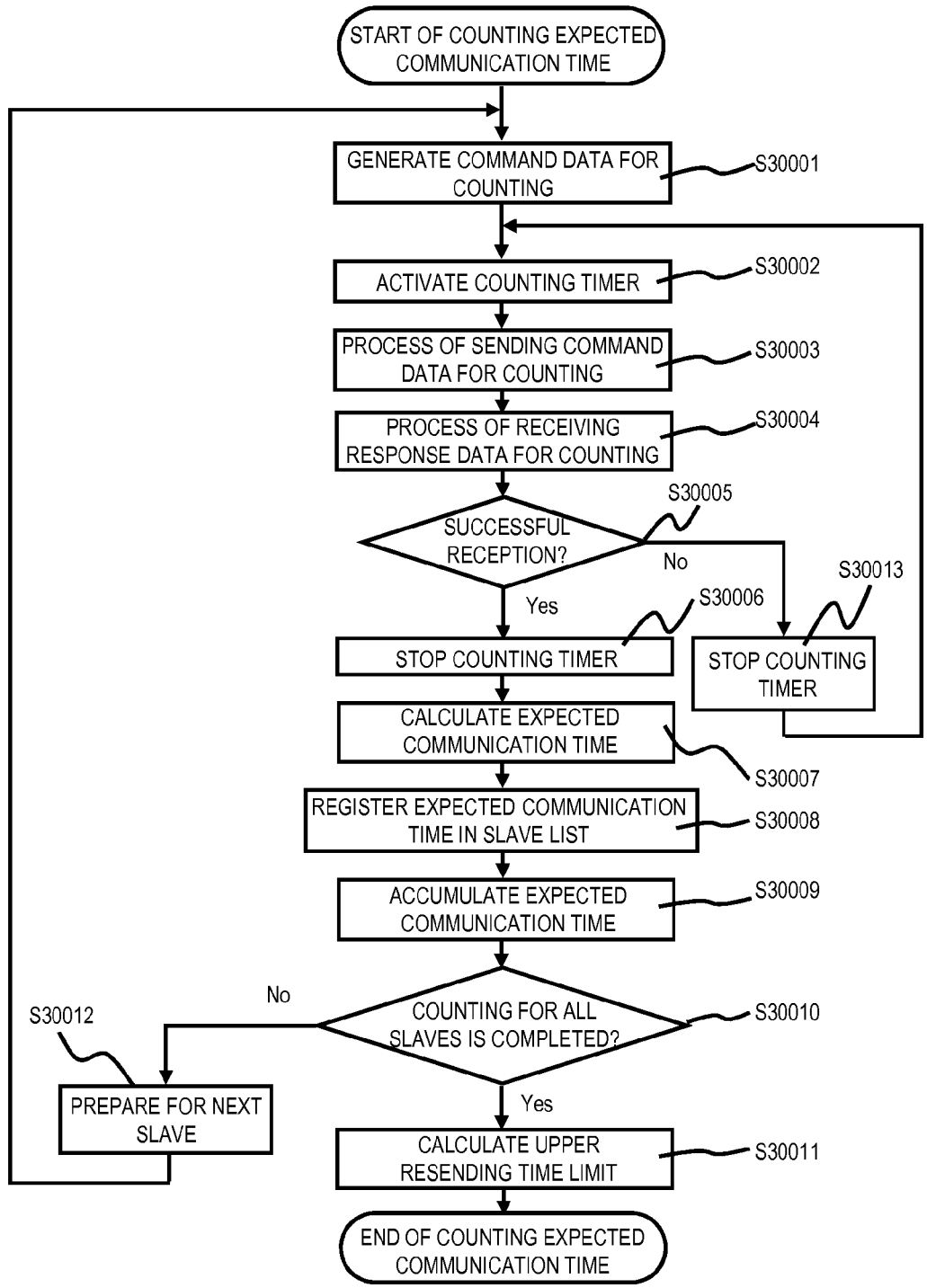
FIG. 4 is a flowchart illustrating an operation example of an expected-communication-time counting process in the first embodiment of the present invention.

In the first and second embodiments, before the start of exchange of control data, the master 1 counts the expected communication time of each slave, in accordance with the procedure illustrated in FIG. 4, by using the command data for counting and the response data for counting. The master 1 saves the result in the slave list 124. After the exchange of control data, the master 1 refers to the value stored in the slave list 124.

In contrast, in the third embodiment, after the start of exchange of control data, the communication control unit 130 activates the counting timer 132 before sending command data (between S10002 and S10003 in FIG. 6 and between S20002 and S20003 in FIG. 7). After a successful determination of a sending process/receiving process (between S10005 and S10006 in FIG. 6 and between S20005 and S20006 in FIG. 7), the communication control unit 130 stops the counting timer 132. The communication control unit 130 calculates the expected communication time from the current time of the timer. Using the calculated expected communication time, the communication control unit 130 updates the expected communication time 12441 of the slave in the slave list 124. Here, instead of using the result of calculation in every communication period, the average value obtained in multiple calculations may be used as the expected communication time 12441 to be updated.

In this manner, since resending can be executed without exceeding the preset upper limit, even when resending occurs, the communication period can be prevented from fluctuating. In a motion control system including machine tools and mounters, a motion controller can form a control loop with slave devices through communication in a fixed period.

What is claimed is:

1. A master/slave communication system comprising:
   at least one slave;
   a master to which the at least one slave is connected through a serial transmission line, control data being exchanged between the at least one slave and the master in a predetermined communication period, the master comprising:
      a slave information storage to store slave information of the at least one slave, the slave information including an expected communication time needed to exchange the control data; and
      a resending slave information storage to store resending slave information including a remaining resending time and a resending slave in which an error is detected during exchange of the control data and to which resending needs to be performed,
   wherein in the predetermined communication period, the master executes exchange of the control data with respect to the at least one slave based on the slave information, and then re-executes exchange of the control data with respect to the resending slave based on the resending slave information.

2. The master/slave communication system according to claim 1,
   wherein the at least one slave comprises a plurality of slaves,
   wherein the master calculates the expected communication time in advance before exchange of the control data is executed with respect to the plurality of slaves based on the slave information, and
   wherein the master sends predetermined command data to one slave among the plurality of slaves, the one slave receiving the command data and sending predetermined response data to the master, the master counts a period of time between sending of the command data and receiving of the response data as the expected communication time and concurrently calculating an accumulated value of expected communication times of all the plurality of slaves.

3. The master/slave communication system according to claim 1,
   wherein the at least one slave comprises a plurality of slaves,
   wherein the master calculates the expected communication time in advance before exchange of the control data is executed with respect to the plurality of slaves based on the slave information,
   wherein the master sends predetermined command data to one slave among the plurality of slaves, the one slave receiving the command data and sending predetermined response data to the master, the master counting a period of time between sending of the command data and receiving of the response data as the expected communication time and concurrently calculating an accumulated value of expected communication times of all the plurality of slaves, and
   wherein while executing exchange of the control data, the master calculates a time of exchange of the control data and updates the expected communication time with the time of exchange of the control data.

4. The master/slave communication system according to claim 1,
   wherein the at least one slave comprises a plurality of slaves,
   wherein the master subtracts an accumulated value of expected communication times of all the plurality of slaves from the predetermined communication period to set an initial value of an upper resending time limit,
   wherein every time exchange of the control data is re-executed, the master subtracts the expected communication time corresponding to re-execution of exchange of the control data from the upper resending time limit to set the remaining resending time, and
   wherein the master continues the re-execution of exchange of the control data when the remaining resending time is longer than the expected communication time corresponding to the re-execution.

5. The master/slave communication system according to claim 1, wherein when an error is detected during exchange of the control data, the master stores the resending slave as the resending slave information in the resending slave information storage when the remaining resending time is equal to or longer than the expected communication time corresponding to re-execution of exchange of the control data.

6. A master/slave communication system comprising:
at least one slave; and
a master to which the at least one slave is connected to the master through a serial transmission line, control data being exchanged between the at least one slave and the master in a predetermined communication period,
wherein in the predetermined communication period and after the master executes exchange of the control data with respect to the at least one slave, the master re-executes exchange of the control data with respect to a resending slave which is stored when an error is detected in the resending slave during exchange of the control data and to which resending of the control data needs to be performed.

7. A master/slave communication method for a master/slave communication system, the master/slave communication system comprising:
at least one slave; and
a master to which the at least one slave is connected through a serial transmission line, control data being exchanged between the at least one slave and the master in a predetermined communication period, the master comprising:
a slave information storage to store slave information of the at least one slave, the slave information including an expected communication time needed to exchange the control data; and;
a resending slave information storage to store resending slave information including a remaining resending time and a resending slave in which an error is detected during exchange of the control data and to which resending needs to be performed,
said master/slave communication method comprising:
executing, by the master, in the predetermined communication period, exchange of the control data with respect to the at least one slave based on the slave information, and then
re-executing exchange of the control data with respect to the resending slave based on the resending slave information.

8. The master/slave communication method according to claim 7,
wherein the at least one slave comprises a plurality of slaves,
wherein the master calculates the expected communication time in advance before exchange of the control data is executed with respect to the plurality of slaves based on the slave information, and
wherein the master sends predetermined command data to one slave among the plurality of slaves, the one slave receiving the command data and sending predetermined response data to the master, the master counting a period of time between sending of the command data and receiving of the response data as the expected communication time and concurrently calculating an accumulated value of expected communication times of all the plurality of slaves.

9. The master/slave communication method according to claim 7,
wherein the at least one slave comprises a plurality of slaves,
wherein the master calculates the expected communication time in advance before exchange of the control data is executed with respect to the plurality of slaves based on the slave information,
wherein the master sends predetermined command data to one slave among the plurality of slaves, the one slave receiving the command data and sending predetermined response data to the master, the master counting a period of time between sending of the command data and receiving of the response data as the expected communication time and concurrently calculating an accumulated value of expected communication times of all the plurality of slaves, and
wherein while executing exchange of the control data, the master calculates a time of exchange of the control data and updates the expected communication time with the time of exchange of the control data.

10. The master/slave communication method according to claim 7,
wherein the at least one slave comprises a plurality of slaves,
wherein the master subtracts an accumulated value of expected communication times of all the plurality of slaves from the predetermined communication period to set an initial value of an upper resending time limit,
wherein every time exchange of the control data is re-executed, the master subtracts the expected communication time corresponding to re-execution of exchange of the control data from the upper resending time limit to set the remaining resending time, and
wherein the master continues the re-execution of exchange of the control data when the remaining resending time is longer than the expected communication time corresponding to the re-execution.

11. The master/slave communication method according to claim 7, wherein when an error is detected during exchange of the control data, the master stores the resending slave as the resending slave information in the resending slave information storage when the remaining resending time is equal to or longer than the expected communication time corresponding to re-execution of exchange of the control data.

12. A master/slave communication method for a master/slave communication system, the master/slave communication system comprising:
at least one slave; and
a master to which the at least one slave is connected through a serial transmission line, control data being exchanged between the at least one slave and the master in a predetermined communication period,
said master/slave communication method comprising:
re-executing, by the master, in the predetermined communication period and after the master executes exchange of the control data with respect to the at least one slave, exchange of the control data with respect to a resending slave which is stored when an error is detected in the resending slave during exchange of the control data and to which resending of the control data needs to be performed.

13. A master/slave communication method for a master/slave communication system, the master/slave communication system comprising:
at least one slave; and
a master to which the at least one slave is connected through a serial transmission line, control data being exchanged between the at least one slave and the master in a predetermined communication period,
the method comprising:
sending the control data to the at least one slave as processing executed by the master in the predetermined communication period;
receiving, by the master, the control data from the at least one slave;

repeating, for the at least one slave, unconditionally registering the at least one slave as a target to which resending is to be performed when an error is detected in the sending step or in the receiving step;

extracting information regarding the at least one slave registered as the target to which resending is to be performed;

comparing a remaining resending time that can be used to re-execute exchange of the control data with an expected communication time needed to exchange the control data of the slave; and re-executing exchange of the control data when the remaining resending time is longer than the expected communication time of the registered slave.

14. The master/slave communication method according to claim 13,
wherein the at least one slave comprises a plurality of slaves, and
wherein an initial value of the remaining resending time is an upper resending time limit obtained by subtracting a total of expected communication times of all the plurality of slaves from the communication period, and, every time resending of the control data is executed, the expected communication time corresponding to resending of the control data is subtracted from the remaining resending time.

15. The master/slave communication method according to claim 13,
wherein the master sends counting command data to the at least one slave before exchange of the control data is executed, the at least one slave that has received the counting command data sending counting response data to the master, the master counting a period of time between sending of the counting command data and receiving of the counting response data, thereby calculating the expected communication time.

16. The master/slave communication method according to claim 13,
wherein the at least one slave comprises a plurality of slaves, and
wherein the master counts an exchange time of the control data for each of the plurality of slaves during exchange of the control data, and updates the expected communication time based on a counting result.

17. A master/slave communication method for a master/slave communication system, the master/slave communication system comprising:
at least one slave; and
a master to which the at least one slave is connected through a serial transmission line, control data being exchanged between the at least one slave and the master in a predetermined communication period,
the method comprising:
sending the control data to the at least one slave as processing executed by the master in the predetermined communication period;
receiving, by the master, the control data from the at least one slave;
repeating, when a communication error is detected in the at least one slave in the sending step or in the receiving step, registering the error-detected at least one slave as a target to which resending is to be performed when a remaining resending time that can be used to re-execute exchange of the control data is longer than an expected communication time needed to exchange the control data of the at least one slave;
extracting information regarding the at least one slave registered as the target to which resending is to be performed;
re-executing exchange of the control data with the at least one slave registered as the target to which resending is to be performed.

18. The master/slave communication method according to claim 17,
wherein the at least one slave comprises a plurality of slaves, and
wherein an initial value of the remaining resending time is an upper resending time limit obtained by subtracting a total of expected communication times of all the plurality of slaves from the communication period, and, every time an error-detected slave is registered, the expected communication time corresponding to the error-detected slave is subtracted from the remaining resending time.

19. The master/slave communication method according to claim 17,
wherein the master sends counting command data to the at least one slave before exchange of the control data is executed, the at least one slave that has received the counting command data sending counting response data to the master, the master counting a period of time between sending of the counting command data and receiving of the counting response data, thereby calculating the expected communication time.

20. The master/slave communication method according to claim 17,
wherein the at least one slave comprises a plurality of slaves, and
wherein the master counts an exchange time of the control data for each of the plurality of slaves during exchange of the control data, and updates the expected communication time based on a counting result.

\* \* \* \* \*